Feb. 2, 1937.  M. F. ESCH  2,069,406
OIL GAUGE ROD WIPER
Filed Oct. 1, 1935
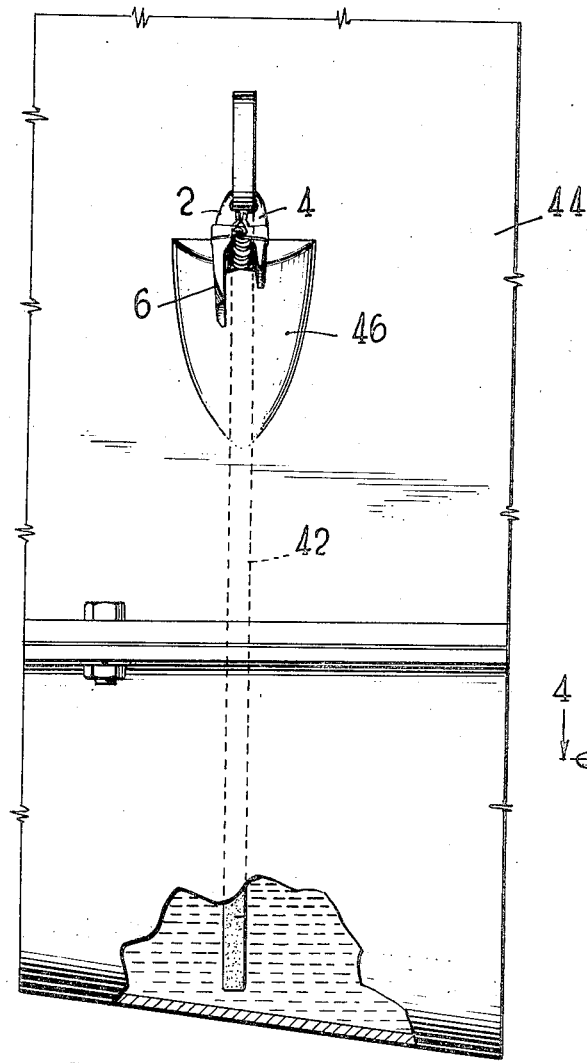
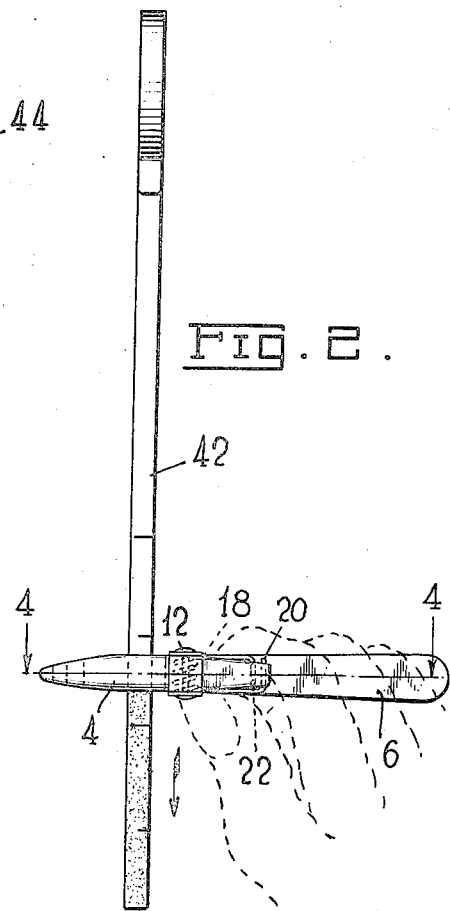
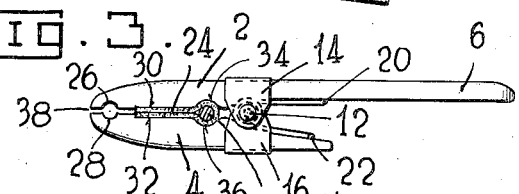
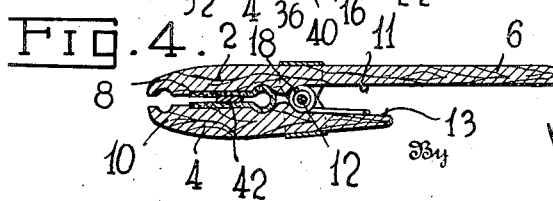
Inventor
Mark F. Esch,
By Bailey & Carson
Attorneys Patented Feb. 2, 1937

2,069,406

UNITED STATES PATENT OFFICE 2,069,406

OIL GAUGE ROD WIPER

Mark F. Esch, Washington, D. C.

Application October 1, 1935, Serial No. 43,122

4 Claims. (Cl. 15—210)

My invention relates to that class of objects known as oil gauge rod wipers, and in particular to an oil gauge rod wiper which is portable.

One of the objects of my invention is to provide a single device suitable for wiping clean the sides of all the various shapes of oil gauge rods, of which many are in use. The invention is particularly adapted to the wiping of round, flat and square rods.

Another object of my invention is to provide an oil rod wiper which is not permanently attached to any part of the vehicle, but which is readily available at all times.

A further object of this device is to provide an arrangement which is readily available at all times, in a convenient location, but which does not need to be secured to any fixed part of the engine with which it is to be used.

Yet another object of my invention is to provide a device of this class which will exert a continuous and even resilient pressure upon the surfaces of the instrument to be wiped clean. Particularly, the arrangement is such that the use of the rod will be quite simple without affecting the operation of the resilient pressure.

I am aware that oil rod wipers are old. I am not aware, however, that any of the oil rod wipers constructed heretofore are arranged with an oil absorbent portion and a gripping portion adjacent thereto for clipping upon various shaped rods at a point beyond the absorbent material while not in use.

It is an object of my invention so to construct an oil rod wiper that it may be clipped upon the oil gauge rod during times in which it is not being used to wipe the rod. One of the advantages to be gained by thus constructing the device is that the absorbent material will not be permanently compressed by the rod. Yet another advantage is that the wiping implement may be clipped upon the oil gauge rod at right angles to and projecting outwardly from the side of the motor crank case. Thus the person using the device will not be obliged to soil his hands by having them come into contact with the walls of the motor.

Another object of my invention is to construct a spring compressed oil rod wiper which may be cheaply constructed and which is operated with the greatest facility.

Oil gauge rod wipers of various shapes have been constructed heretofore for being bolted or otherwise attached to some portion of the motor. Persons wishing to test the oil level of a motor having such a device attached must have a light thrown upon the motor to facilitate location of the wiper. It is well known that it would be undesirable to locate the device by feel. One of the advantages of this invention is that the device is attached to the oil gauge rod and is easily located even in the dark. Another advantage is that the oil gauge rod and the wiper are removable by one motion.

Another object of this invention is to construct a device which may be easily carried with the oil gauge rod to a light when desired.

In order that my device may be more clearly understood I describe the preferred construction of the same by reference to various figures in the attached drawing with the understanding that similar reference numerals are applied to like parts throughout the various figures and in which:

Fig. 1 is a perspective view of the preferred form of my invention as attached to the oil gauge rod when not in use, Fig. 2 is a side view of the same as used to wipe the oil gauge rod, Fig. 3 is a top view of the same showing a round oil rod in section and Fig. 4 is a sectional view along line 4—4 of Fig. 2.

As clearly shown by the drawing, and with particular reference to Fig. 3, I prefer to construct my device of two pieces of wood, 2 and 4, which I shall hereafter call levers. It is to be understood that I do not limit myself to the use of wood since metallic or moulded material may be used. I prefer to have these levers of different lengths, and I use the end 6 of the longer lever as a handle. This arrangement has the advantage that a firm grip may be employed without danger of opening the operating ends 8 and 10 of the levers as would be the case if both levers were of the same length. The other ends of the levers I prefer to be known as wiping arms 8 and 10. Preferably the wiping arms 8 and 10 are tapered toward the ends on their three outward sides. The sides which are not tapered at the ends 8 and 10 are the adjacent sides, and these adjacent sides may be tapered outwardly as at 11 and 13 (Fig. 4).

The levers 2 and 4 are attached movably in any desired fashion upon a pin or fulcrum 12, which is situated between the two levers and transverse to the same. I prefer to attach the levers movably upon this pin by the use of substantially U-shaped hinge pieces 14 and 16. The U-shaped hinge pieces 14 and 16 are preferably made of a thin strip of some metal about onehalf inch wide. Each of the said hinge pieces is constructed with the leg portions of a sufficient length that the same will extend beyond the inner face of the lever. Small holes are provided near the ends of these leg portions so that they are susceptible of being placed in alignment to receive the pin 12 which is thrust through the said openings and between the levers.

In order that the adjacent faces of the wiping arms of the levers may be normally held against each other, I provide a spring which normally urges outwardly the opposite ends of the levers. Any type of simple spring means may be used such as a spiral or coil spring disposed transversely between the levers. I prefer, however, to use the well known type of spring means which consists of a piece of suitable wire, the central portion of which is arranged in spiral form 18 and the ends 20 of which extend outwardly from the spiral portion in planes at an angle to each other. The spiral portion of the spring is held in position upon the pin 12 which extends down through the said spiral portion 18. The ends 20 and 22 bear against the inner faces of the levers on that side of the fulcrum pin 12 which is to be used as a handle. The spring is restrained against lateral movement along the pin 12 by the extended hinge pieces 14 and 16.

The adjacent faces of the wiping arms of this device are recessed for clipping upon a round rod or flat rod and also for reception of a strip of absorbent material 24 for wiping clean the oil gauge rod. Spaced inwardly from the resistance end of each of the levers I have provided grooves 26 and 28. These grooves are substantially semi-cylindrical in cross section and they are cut transversely across the wiping ends of the arms of the lever. Each of the grooves is the same distance away from the ends of the lever so as to be in register with each other and thus form a substantially cylindrically shaped groove. The groove thus provided forms a suitable gripping means for an oil gauge rod which is round in cross section. These recesses are suitable also to hold the device upon a flat rod. When the device is clamped upon the latter shape of rod the edges of the rod are lodged in the grooves 26 and 28 as shown in Fig. 1, and the wiper device is more firmly held thereby against vibration. These recesses thus serve for holding the device on the rod when not in use in a position where it is easily available but is not likely to be lost.

Other recesses are provided in the adjacent faces of the levers between the recesses 26 and 28 and the fulcrum or pin 12. The recesses 30 and 32 are provided for the reception of a strip of oil absorbent material 24. In order to form the recesses 30 and 32 I remove the face of each of the lever arms substantially through the whole length of the same from the recesses 26 and 28 to the fulcrum or pin 12. At the end nearest the fulcrum pin the recesses are cut or otherwise enlarged to a greater depth to form substantially semi-cylindrical grooves 34 and 36 which, when in register, form one substantially cylindrical groove transverse to the lever arms.

Any type of absorbent strip material may be used. I prefer to use a strip of felt which is the same width as the width of the lever and which is slightly greater than twice the length of the recess 30 or 32. It is an important part of this invention that the thickness of the absorbent material shall be greater than the depth of the recess 30 or 32. This thickness is essential because of the fact that it is intended that the absorbent material shall hold the ends of the resistance arms slightly spaced to form the opening 38, the use of which opening shall be described later. Since when not in use the device is carried by a gauge rod with the jaws slightly open, this felt will not be subjected to any continuous pressure which would tend to cause it to be permanently compressed into a thinner strip.

The absorbent material 24 may be attached or applied to the faces of the recesses in any known or desired manner such as by the use of an oil resisting glue, the use of small tacks or by the use of metallic U-shaped clips. The material is doubled upon itself on being attached, and it is disposed within the recesses with the closed end of the material at the deeper end 34 and 36 of the recess. I have provided the deeper ends of the recesses, and I have shaped them in a substantially semi-cylindrical shape so that when it is desired to wipe clean the surface of a round oil rod 40, the oil absorbent material will contact against substantially the entire circumference of the round oil rod, as clearly shown in Fig. 3. The long flat opposed surfaces of the absorbent material are adapted for the use of wiping clean flat oil gauge rods 42, as clearly shown in Figs. 2 and 4.

The ends of the wiping arms are held spaced apart by the thickness of the absorbent material to provide the opening 38 mentioned above. This opening has been provided so that the device may be clipped upon a flat oil rod of the type shown in Figs. 2 and 4 in a way different from that described above wherein the edges of the rod were lodged in the grooves 26 and 28. The end of the resistance arms are held spaced apart by the thickness of the absorbent material to provide the opening 38. The spacing assures a firm grip upon the surface of a flat oil gauge rod which would not be possible if it were necessary to open the levers about the pin 12 from a tightly closed position. If no such space were provided it would be found that only the inner portion faces would be gripping the rod.

A description of the use of my device with respect to its application will aid in making clear my invention. In Fig. 1 I have shown a portion of the crank case wall 44 of a motor with the oil gauge rod 42 extending down through the usual type of opening 46 provided in the side of the wall 44. The oil rod wiping device is shown in this figure in the normal position which it will occupy while the motor is running and while it is not used in wiping clean the oil gauge rod. It will be immediately clear from an inspection of this figure that the person desiring to measure the oil will find it convenient to grip the handle 6 of the wiping device without danger of soiling his hands. Slight pressure is exerted against the spring by manipulation of the short lever with the thumb, and the cleaning device is moved to a position similar to that shown in Fig. 2 but above the oil residue. The rod may be drawn up through the opening 46 while the wiping device is held in position shown in Fig. 1. Any excess oil which is not absorbed into the absorbent material 24 will drop through the opening 46 back into the crank case. Of course, the device may be used as follows: The person desiring to wipe the oil gauge rod free of oil may grasp either the hooked end of the rod 42, or he may grasp the handle 6 of the wiping device and remove the rod and the wiping device together. After he has thus removed the rod and the wiping device from their position on the car he may, as described above, move the wiping device forward on the rod before cleaning the latter.

Though I have prescribed the preferred form of my invention, I do not limit myself to the specific form described and shown, but I reserve the right to make all changes falling within the spirit of my invention.

What I claim is:

1. In an oil gauge rod wiper, a pair of levers pivoted on a common fulcrum, one of said levers being of greater length than the other, said fulcrum being spaced inwardly the same distance from adjacent ends of said levers to form adjacent wiping arms of equal length, a transverse groove in the adjacent faces of said wiping arms, a recess in each of said faces between said grooves and said fulcrum, an oil absorbent material disposed within said recesses and means normally to urge together the adjacent faces of said wiping arms.

2. In an oil gauge rod wiper, a pair of levers pivoted on a common fulcrum, said fulcrum being spaced inwardly the same distance from adjacent ends of said levers to form adjacent wiping arms of equal length, a transverse groove in the adjacent faces of said wiping arms, a recess in each of said faces between said grooves and said fulcrum, an oil absorbent material thicker than the depth of said recesses disposed within said recesses and means normally to urge together the adjacent sides of said wiping arms.

3. In an oil gauge rod wiper, a pair of levers, one of said levers being of greater length than the other, a common fulcrum between said levers, said fulcrum being spaced inwardly the same distance from adjacent ends of said levers to form adjacent wiping arms of equal length, a transverse groove in the adjacent faces of said wiping arms, a recess in each of said faces between said grooves and said fulcrum, a substantially U-shaped strip of oil absorbent material thicker than the depth of said recesses disposed within said recesses, the closed end being adjacent to said fulcrum and means between said levers normally to urge together the adjacent sides of said wiping arms.

4. In an oil gauge rod wiper, a pair of levers, means pivotally connecting said levers together intermediate their ends to form wiping portions on one side of the pivot and handle portions on the other side thereof, means normally urging said wiping portions together, the adjacent faces of said wiping portions having opposed recesses therein and substantially flat opposed surfaces adjacent said recesses and on the opposite side thereof from the pivot, and a single strip of absorbent material having its free ends secured along said flat surfaces and its bight secured in said recesses and extending across the space between said wiping portions.

MARK F. ESCH.